United States Patent [19]

Coslett

[11] Patent Number: 5,105,867
[45] Date of Patent: Apr. 21, 1992

[54] COLLAPSIBLE SUN SHADE AND IMPROVED METHOD FOR SHIELDING THE SUN

[76] Inventor: Fred L. Coslett, 4227 Boca Pointe Dr., Sarasota, Fla. 34238

[21] Appl. No.: 611,823

[22] Filed: Nov. 13, 1990

Related U.S. Application Data

[63] Continuation-in-part of Ser. No. 519,960, May 7, 1990.

[51] Int. Cl.5 .............................. E06B 9/06
[52] U.S. Cl. ...................... 160/84.1; 160/370.2; 160/192; 242/107
[58] Field of Search .......... 160/84.1, 370.2, 192, 160/193, 188, 313; 242/107

[56] References Cited

U.S. PATENT DOCUMENTS

| | | | |
|---|---|---|---|
| 3,156,430 | 11/1964 | Zivi | 242/107 |
| 4,758,042 | 7/1988 | Liu | 160/84.1 X |
| 4,886,104 | 12/1989 | Eldridge, Jr. | 160/84.1 X |
| 4,932,711 | 6/1990 | Goebel | 160/84.1 X |

FOREIGN PATENT DOCUMENTS 647711 10/1962 Italy .................................. 160/192

Primary Examiner—Blair M. Johnson
Attorney, Agent, or Firm—John Wade Carpenter

[57] ABSTRACT

A collapsible sun shade having plural pleated blades consecutively joined in series to form a serrated shape with an upper blade mounted within a hollow housing and a lower blade secured to a plate member. A constant force spring plate is resiliently wound around a spring spool member and further engaged to an output spool, both of which spools being rotatably mounted within a hollow handle secured to the hollow housing. One end of a cord is connected to the output spool and the other end passes from the handle and into housing and through each of the blades and connects to a plate member that is capable of being biasingly retained over the hollow housing by the constant force spring plate when the plurality of blades are folded into the hollow housing in an accordion-like fashion. A method for shielding the sun which includes grasping the plate member and pulling the plate member away from the hollow housing until a desired length of plural blades has been presented for sun shielding purposes.

23 Claims, 13 Drawing Sheets

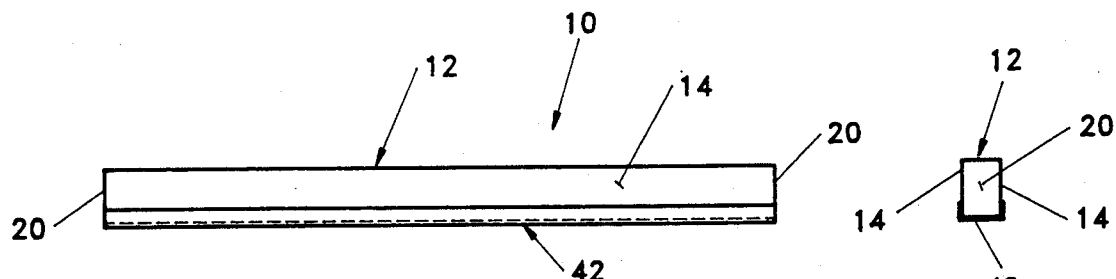
Fig. 1
Fig. 2
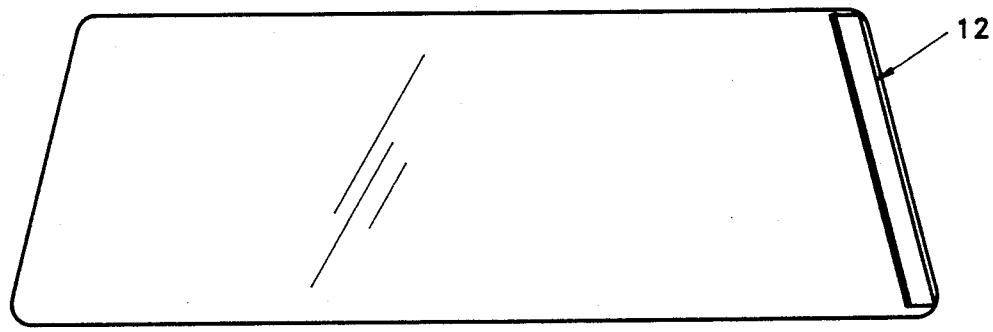
Fig. 3
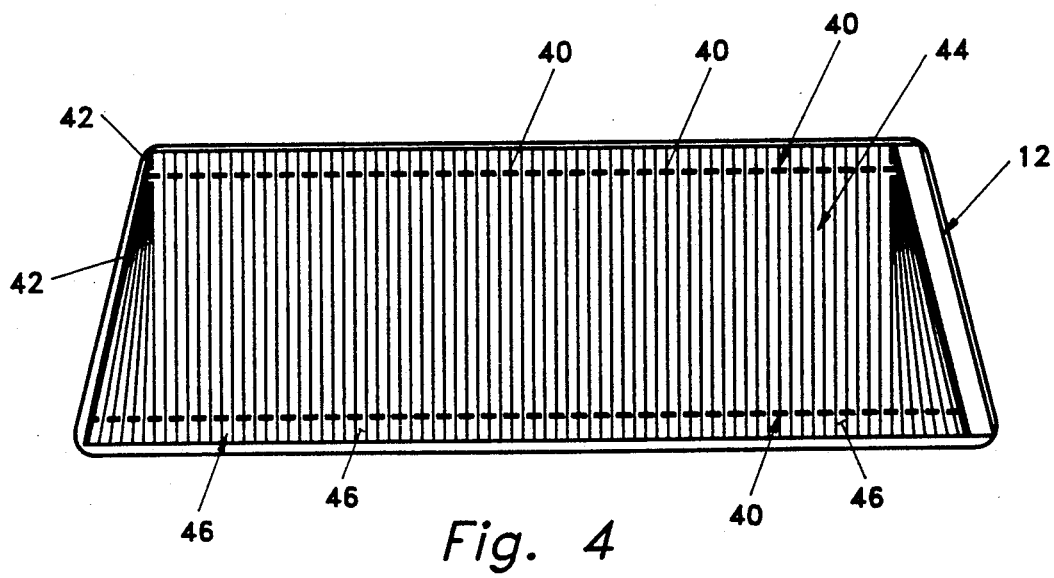
Fig. 4

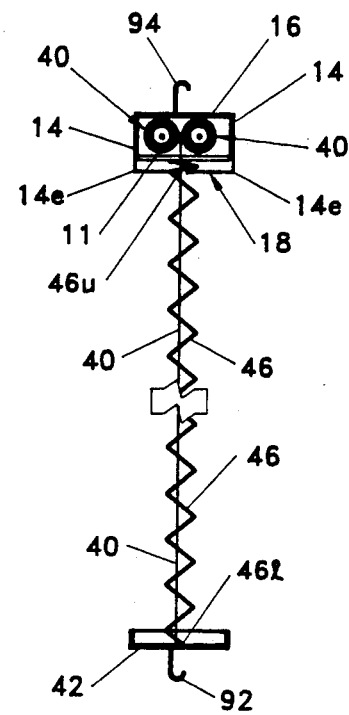
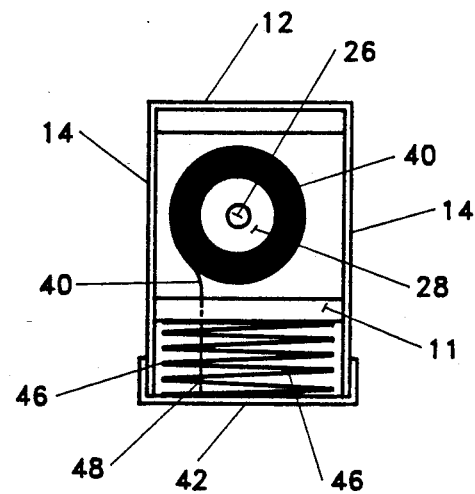
Fig. 20
Fig. 17
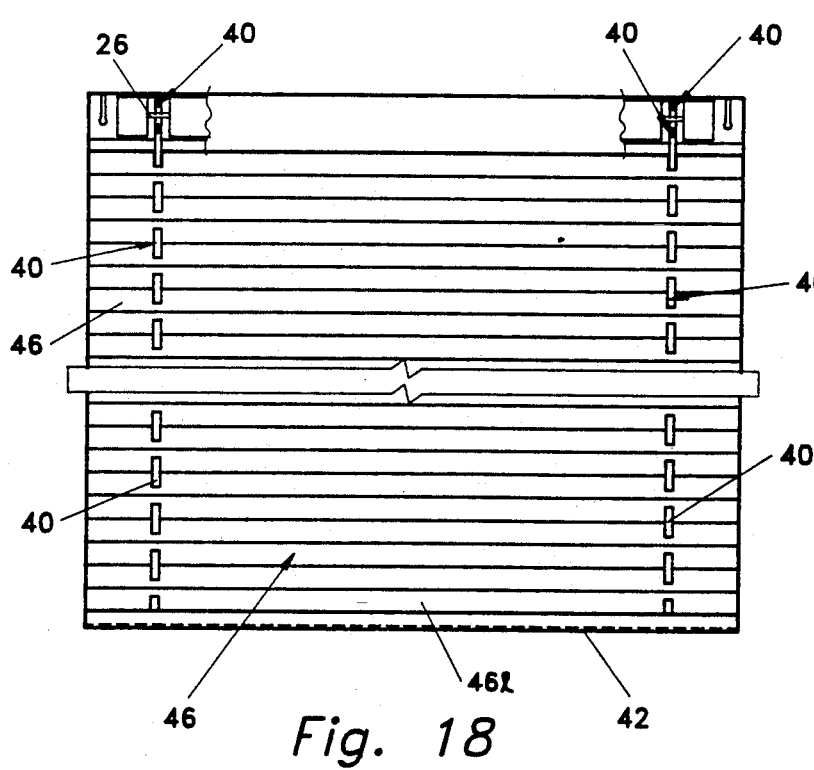
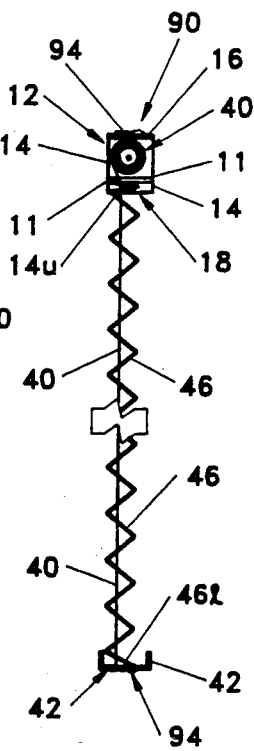
Fig. 18
Fig. 19

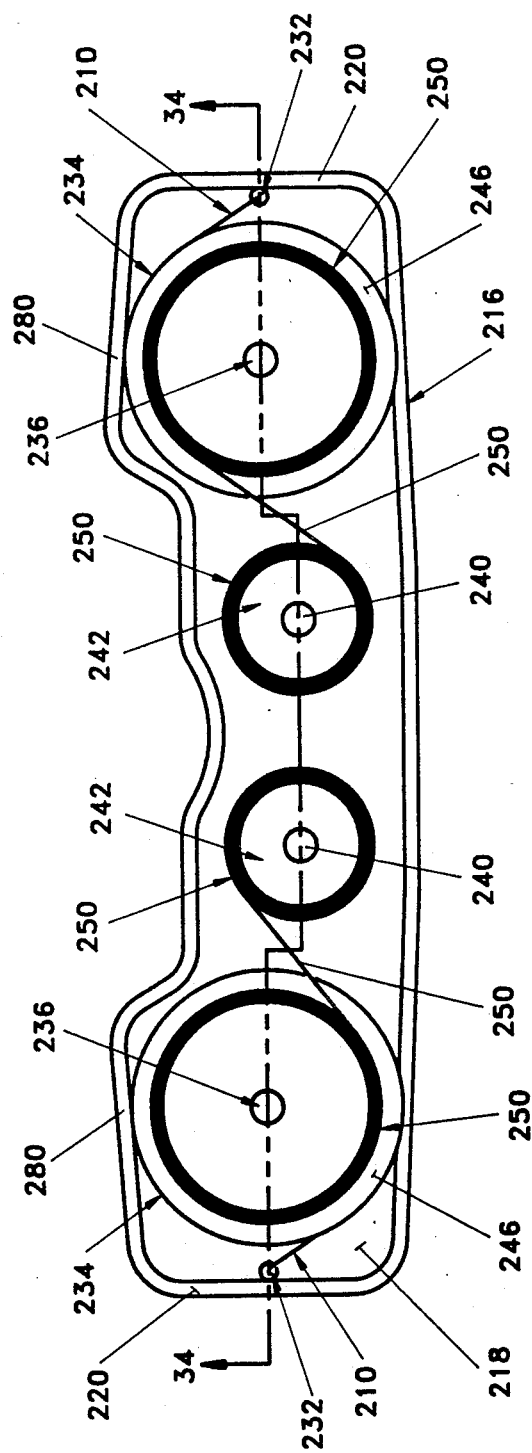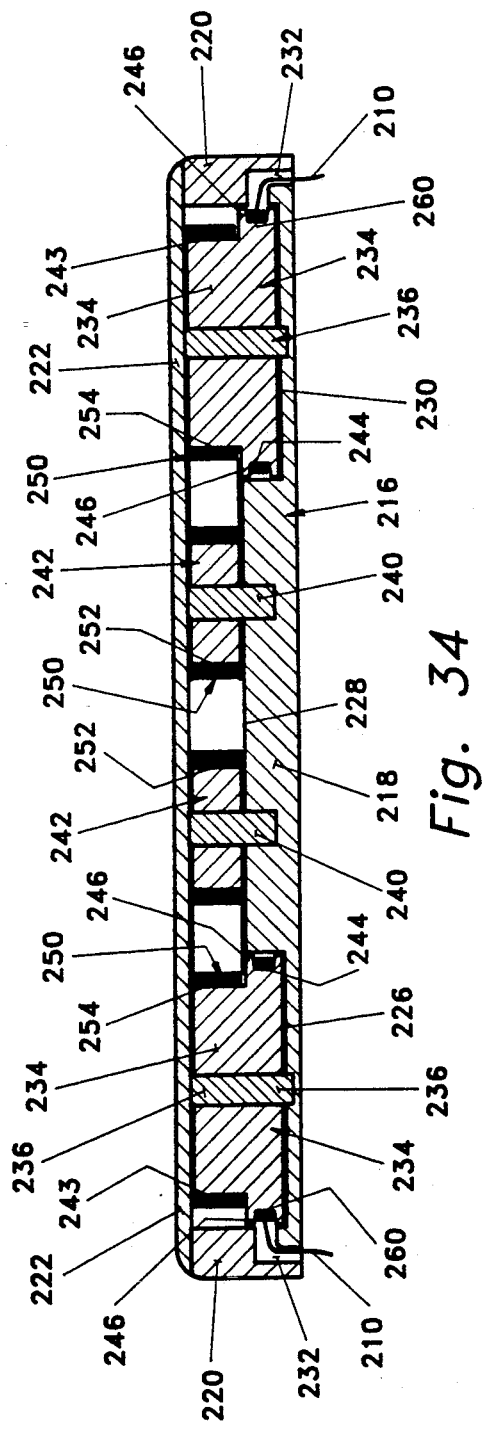

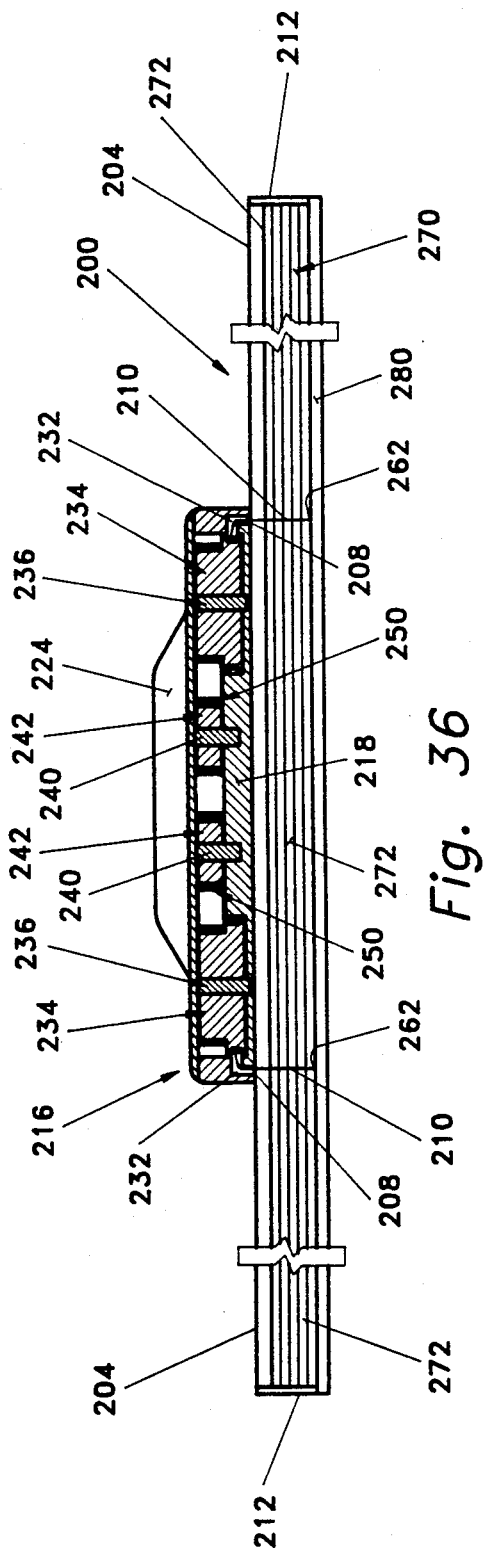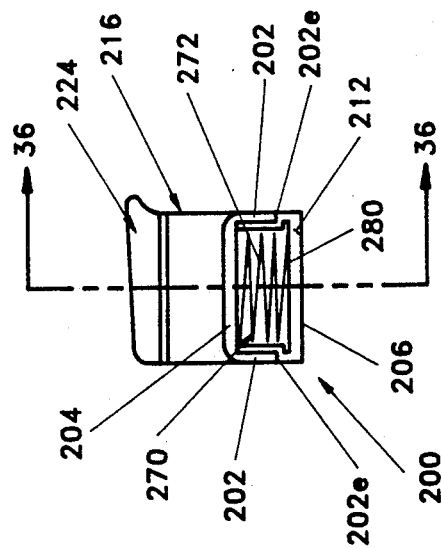

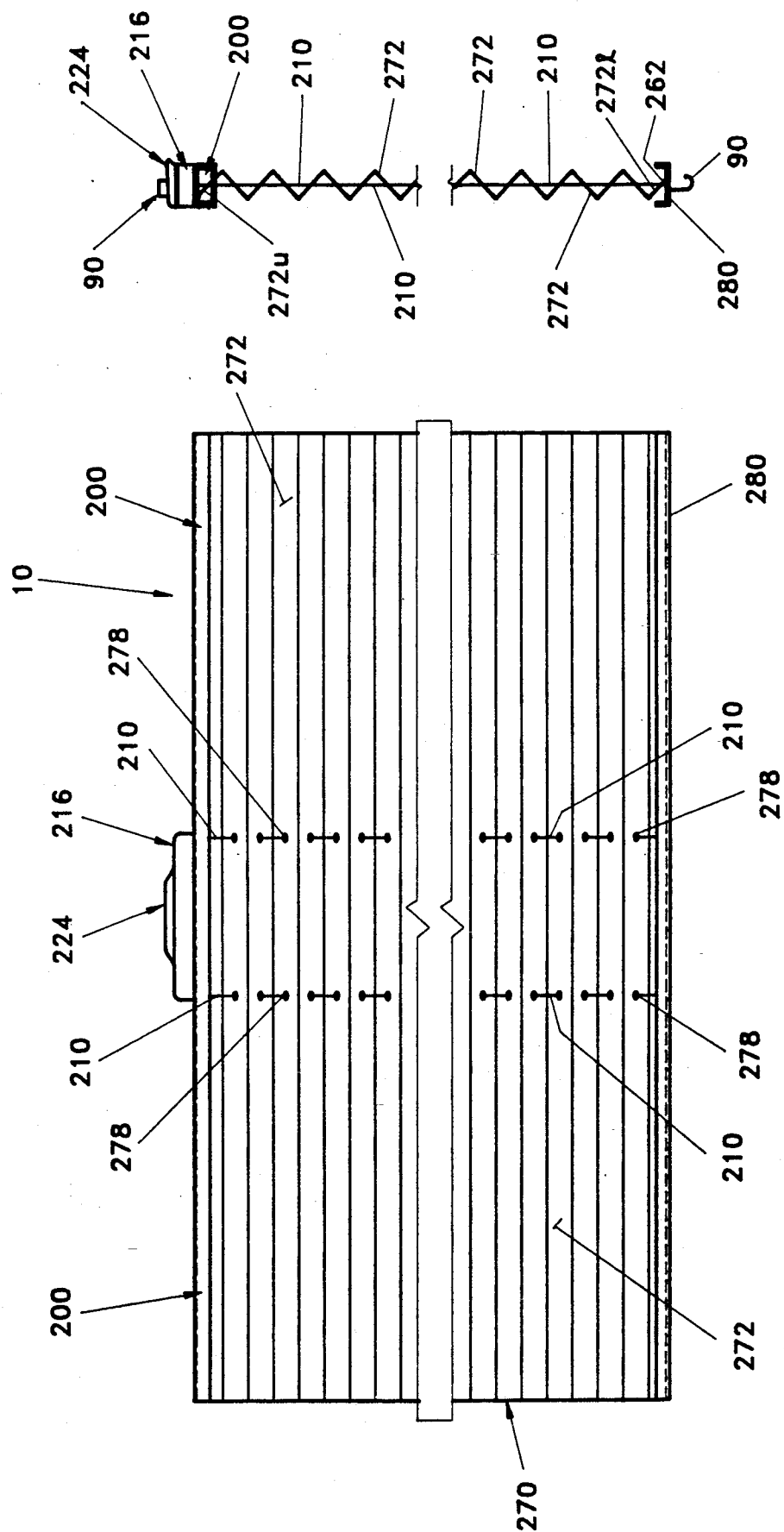

COLLAPSIBLE SUN SHADE AND IMPROVED METHOD FOR SHIELDING THE SUN

This is a continuation-in-part application of copending application having Ser. No. 07/519,960, filed May 7, 1990.

FIELD OF THE INVENTION

This invention relates to an improved anti-glare device for shielding the rays of light emanating from the sun. More particularly, the present invention provides an improved collapsible sun shade that can be adjustably and removably secured in proximity to a transparent panel, such as a windshield of a vehicle or a picture window in a house, for eliminating or modifying rays and light emanating from the sun and/or reflected from shiny ornamentations or accessories postured in proximity to the transparent panel.

DESCRIPTION OF THE PRIOR ART

A patentability investigation was conducted and the following U.S. patents by Nos. were discovered: U.S. Pat. No. 3,003,812 to Haugland; U.S. Pat. No. 4,248,473 to Hildebrand; U.S. Pat. No. 4,647,102 to Ebrahimzadeh; U.S. Pat. No. 4,707,018 to Gavagan; U.S. Pat. No. 4,758,042 to Liu, and U.S. Pat. No. 4,775,180 to Phillips. All of these prior art U.S. patents are fully incorporated herein by reference thereto.

SUMMARY OF THE INVENTION

The present invention accomplishes its desired objects by broadly providing an improved collapsible sun shield comprising a generally hollow housing wherein a serrated shielding means for shielding the sun can be folded in an accordion-like fashion. A generally hollow handle (or a second hollow housing) is secured to the hollow housing. At least one output spool and at least one spring spool is rotatably contained in the hollow handle (or second housing). The serrated shielding means for shielding the sun comprises a plurality of pleated blades consecutively adjoined together for forming a corrugated or serrated shape with a pair of extreme blades. One of the extreme blades defines a lower blade while the other extreme blade defines an upper blade. Each blade of the serrated shielding means has a structure defining an aperture. The upper blade of the serrated shielding means is contained in the hollow housing and is secured to or mounted to the inside of said hollow housing. The lower blade of the serrated shielding means is connected to a plate or cover member which is capable of closing in the hollow housing when the serrated shielding means is folded or collapsed thereinto. The collapsible sun shield also comprises at least one constant force spring plate having an upper or first end portion that is mounted to the spring spool (or spring spindle member) and a lower or second end portion that connects to the output spool (or output spindle member). A cord connects to the output spool and passes from the handle and into the housing and through each aperture of the plurality of blades and connects to the plate or cover member. Generally the majority of the structure of the constant force spring helically surrounds the spring spool or spring spindle member such as to be normally resiliently wound thereon. When the plate or cover member is grasped and lifted and/or pulled away from the hollow housing, such movement causes the folded serrated shielding means to unfold from within the hollow housing and extend biasingly the cord whose lower end portion is connected to the plate or cover member. The plate or cover member is continually pulled or extended away from the hollow housing until a desired length of adjoined blades has been obtained from the hollow housing. Subsequently the plate or cover member may be connected to a support member (or the like) to maintain the desired length of adjoined blades and to prevent the cord from retracting on the rotatable output spool or spindle member from the constant force spring plate biasingly acting on the output spool while being resiliently wound on the spring spool. When the output spool or output spindle member becomes non-rotatable by the fastening of the plate or cover member to a support post, the constant force spring plate can not retract on the spring spool to cause the cord to retract the plurality of blades and helically surround and wind around the output spool or spindle member. Alternatively, the plate or cover member may be secured to a support post, and the handle member is grasped and pulled away from the secured plate/cover member. When the desired length of adjoined blades is extended, the handle member may be secured to a support member to maintain the desired length.

The present invention also accomplishes its desired objects by further broadly providing an improved method for shielding the sun comprising the steps of:

(a) providing a generally hollow handle member having at least one output spool rotatably contained therein and at least one spring spool also rotatably contained within the handle member;

(b) securing the handle member to a generally hollow housing;

(c) providing a serrated shielding means for shielding the sun and having a plurality of pleated blades consecutively adjoined together to furnish a serrated shape with an upper extreme blade and a lower extreme blade and with each of said plural blades having a structure defining an aperture;

(d) mounting the upper extreme blade of the serrated shielding means in the generally hollow housing;

(e) connecting a first end section of a constant force spring plate to the spring spool and winding the constant force spring plate around the spring spool such that the constant force spring plate is normally resiliently wound thereto;

(f) extending a second end section of the constant force spring plate from the spring spool to the output spool;

(g) connecting a cord to the output spool and passing the cord through each aperture of each blade;

(h) connecting the lower extreme blade of the serrated shielding means and an end of the cord to a plate or cover member and folding the serrated shielding means into the generally hollow housing such that the constant spring plate biasingly resiliently retains the serrated shielding means within the hollow housing;

(i) grasping either the plate/cover member or the handle member and pulling the same from the hollow housing or the plate/cover member respectively until a desired length of serrated shielding means has been extended away from the hollow housing for sun shielding purposes; and (j) connecting the plate/cover member or the handle member to a support member in order to maintain the extension of the desired length of serrated shielding means from the hollow housing such that the desired length shields the sun.

It is therefore an object of the present invention to provide an improved collapsible sun shade.

It is another object of the present invention to provide an improved method for shielding the sun.

These, together with the various ancillary objects and features which will become apparent to those skilled in the art as the following description proceeds, are attained by this novel improved collapsible sun shade and improved method as shown with reference to the accompanying drawings by way of example only, wherein;

BRIEF DESCRIPTION OF THE DRAWINGS

FIG. 1 is a side elevational view of the collapsible sun shade assembly totally contained in a housing;

FIG. 2 is an end elevational view of the collapsible sun shade assembly of FIG. 1;

FIG. 3 is a front elevational view of the housing containing a retracted shade assembly and mounted to a support post of a windshield of a vehicle or directly to the windshield of the vehicle;

FIG. 4 is a front elevational view of the collapsible sun shade wherein the shade assembly is extended out of the housing and across the windshield and the plate member or cover plate is connected to the windshield or to a support post opposed to the support post supporting the housing of the collapsible sun shade;

FIG. 17 is a segmented side elevational view of the coiled spring assembly illustrating a pair of coiled spring plates extended such that the structures of the pair of coiled spring plates are in a contacting relationship and pass through apertures in each of the blades and connect to the plate member or cover plate;

FIG. 18 is a segmented front elevational view of the shade assembly extended out of the housing wherein a pair of coiled spring plates are rotatably mounted such that the axis of the respective spool or spindle members is longitudinally disposed with respect to a rectangular shaped hollow housing that encloses the respective spool or spindle members;

FIG. 19 is a segmented end elevational view of the collapsible sun shade of FIG. 18;

FIG. 20 is an enlarged end elevational view of the collapsible sun shade having the serrated shielding means totally enclosed within the housing with the cover plate disposed over the opening of the hollow housing;

FIG. 33 is a top view of the housing with the housing top or roof removed including the contorque springs employed and disposed in the housing to provide tension and support to the cords passing through the shade material and/or blades and to provide the means for retracting the shade into the housing;

FIG. 34 is a vertical section view taken in direction of the arrows and along the plane of line 34—34 in FIG. 33 and showing the arrangement of the spring assemblies within the handle and housing enclosure of the shade assembly; and further depicting the cord which is used to support and retract the shade assembly as being attached to the output spool of the contorque spring assembly; and FIG. 35 is an end view of the shade assembly showing the top and bottom of the housing with the handle containing the contorque spring assemblies mounted on the top of the housing and the shade material being contained within the housing;

FIG. 36 is a vertical section view taken in direction of the arrows and along the plane of line 36—36 in FIG. 35 showing the contorque spring assemblies mounted in the handle and the handle being mounted on the top or roof of the housing and with the cords being secured to the output spools and extended through the top of the housing, through the shade material and/or blades and are attached to the bottom plate member or cover member;

FIG. 37 is a front elevational view of the shade assembly extended out of the housing with the cords passing through the holes in each of the panels or blades of the shade material; and FIG. 38 is a side elevational view of the shade assembly of FIG. 37.

DETAILED DESCRIPTION OF THE INVENTION

Figure 8:
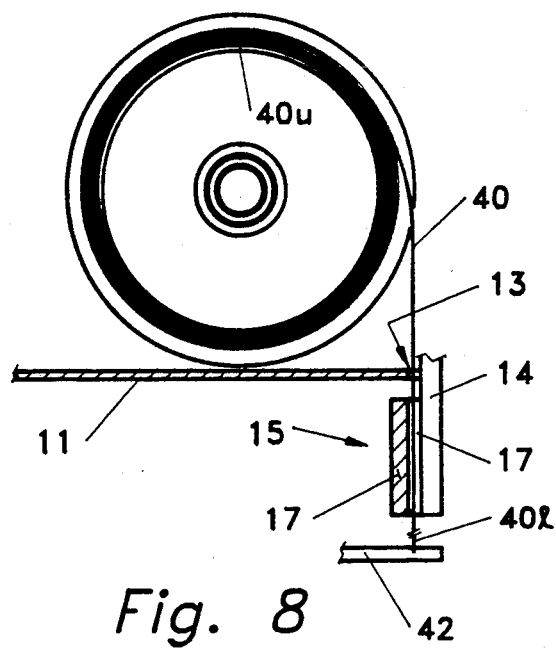
FIG. 8 is an enlarged vertical sectional view disclosing the coiled spring plate wound around the spool or spindle member with a free end of the coiled spring plate passing through a guide slot.

Referring in detail now to the drawings where similar parts of the invention are represented by like reference numerals, there is seen the collapsible sun shade, generally illustrated as 10. The collapsible sun shade 10 comprises a generally hollow housing, generally illustrated as 12, which has a pair of opposed sides 14—14 with lower edges 14e—14e, a back 16 bound to the opposed sides 14—14, and a front, generally illustrated as 18, which is generally open. A partition member 11 is connected to the opposed sides 14—14 and has a guide aperture 13 for guiding and receiving therethrough the structure of a coiled spring plate to be identified as 40 below. Connected to the ends of the sides 14—14 and the back 16 is a pair of ends 20—20 such that the hollow housing 12 essentially forms a rectangular box with the partition member 11 forming a floor or partition and the front 18 providing a longitudinal opening that is defined by the distance between the lower edges 14e—14e and the ends 20—20. Optionally, the hollow housing 12 may be formed with a guide chute 15 (see FIG. 8) which is defined by a U-shaped guide channel member 17 bound to a side 14. The function of the guide aperture 13 and the guide chute 15 is to guide the below identified coiled spring plate as it leaves the hollow housing 12.

Figure 9:
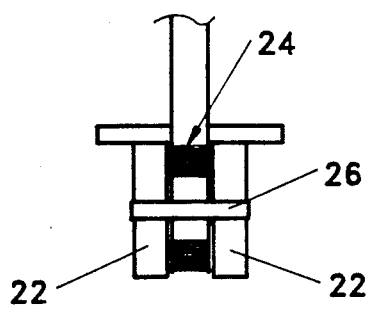
FIG. 9 is an end elevational view of one embodiment of the coiled spring plate wound around a spool or spindle member which is rotatably, mounted to a pair of support posts or members.
Figure 16:
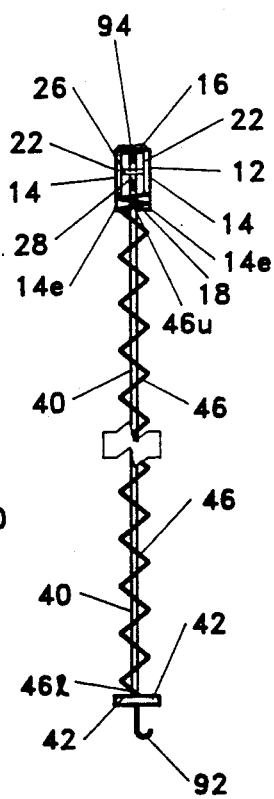
FIG. 16 is a segmented end elevational view of the collapsible sun shade of FIG. 15.
Figure 21:
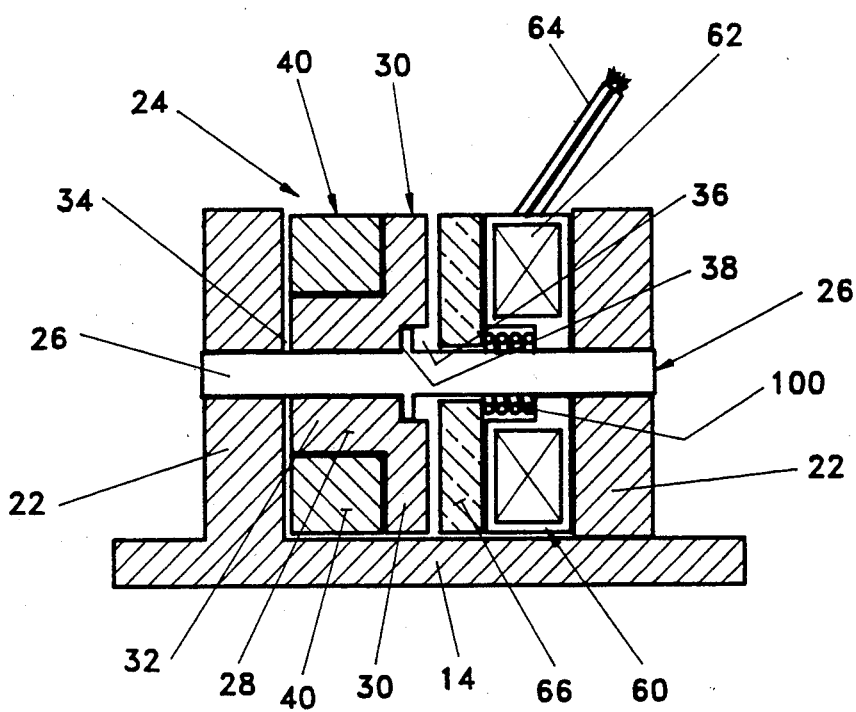
FIG. 21 is a vertical sectional view of an electromechanical brake member disposed on a support member such as to be in a position to releasably engage a spool or spindle member to prevent same from rotating and assisting in the releasing of a coiled spring plate wound thereto.
Figure 22:
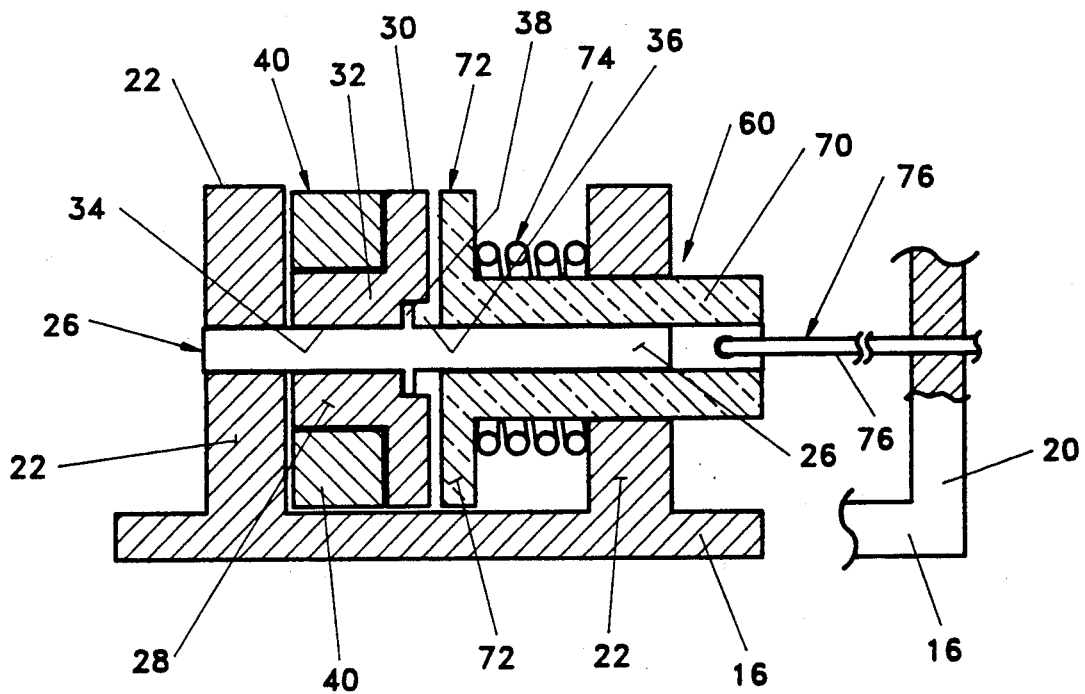
FIG. 22 is a vertical sectional view of a mechanical brake member disposed on a support member such as to be in a position to releasably engage a spool or spindle member to prevent same from rotating and assisting in the release of a coiled spring plate wound thereto.

Mounted to the inside of the hollow housing 12, more particularly to the back 16 of the housing 12, is at least one pair of support members 22—22, preferably two pairs of support members 22—22 and 22—22 as best shown in FIG. 9 or 16. Each pair of support members 22—22 has the respective support members 22 opposed to each other at a predetermined, desired distance such that each pair of support members 22—22 is separated by an opening or space, generally illustrated as 24. Rotatably secured to each pair of support members 22—22 and bridging the space 24 is a shaft 26. Rotatably mounted on the shaft 26 is a spool or spindle member 28. As best illustrated in FIGS. 21 and 22, the spindle member 28 comprises a flanged face 30 integrally formed with a body 32 and a longitudinal bore 34 extending through the body 32 and the flanged face 30. The shaft 26 rotatably passes through the bore 34. Preferably, the flanged face 30 has a recess 36 and the shaft 26 has a bearing plate 38 integrally formed therewith for seating in the recess 36. As best illustrated in FIGS. 21 and 22, the bearing plate 38 functions to maintain the spindle member 28 in close proximity to one of the support members 22; thus, the spindle member 28 is rotatably sandwiched between one of the support members 22 and the bearing plate 38 while being rotatably mounted on the shaft 26.

The collapsible sun shade 10 also comprises a coiled spring plate, generally illustrated as 40, which is normally resiliently wound on the body 32 of the spindle member 28. More specifically, the coiled spring plate 40 has an upper end portion 40U affixed to the body 32 and a lower end portion 40L which passes through the guide aperture 13 and/or the guide chute 15 which, as previously indicated, is defined by the U-shaped guide channel member 17 mounted to a side 14 of the hollow housing 12. The lower end portion 40L of the coiled spring plate 40 connects to a plate or cover member 42. The coiled spring plate 40 may be of any structure possessing a constant force such that there is a bias or tendency to recoil without the use of any outside force, such as a restoring spring (not shown) in the spool or spindle 28 to help restore the spring plate 40 around the body 32 of the spindle 28. The constant force coiled spring plate 40 provides a complete shade support and retraction power. No other devices are required for these functions, the coiled spring plate 40 provides the smallest and least complicated method for supporting and retracting the shade material, identified as 44 below. A suitable constant force spring plate 40 is that sold under the trademark CONFORCE® owned by the Vulcan Spring and Manufacturing Company.

A serrated shielding means, generally illustrated as 44, is provided for shielding the sun, and includes plural pleated blades 46 (or panel members) consecutively adjoined together to form a serrated (or corrugated) shape as viewed from its longitudinal section. The serrated shielding means 44 has an upper blade 46U secured to partition member 11 and a lower blade 46L secured to the plate or cover member 42. Each blade 46 (including blades 46U and 46L) is formed with a slot 48

Figure 5:
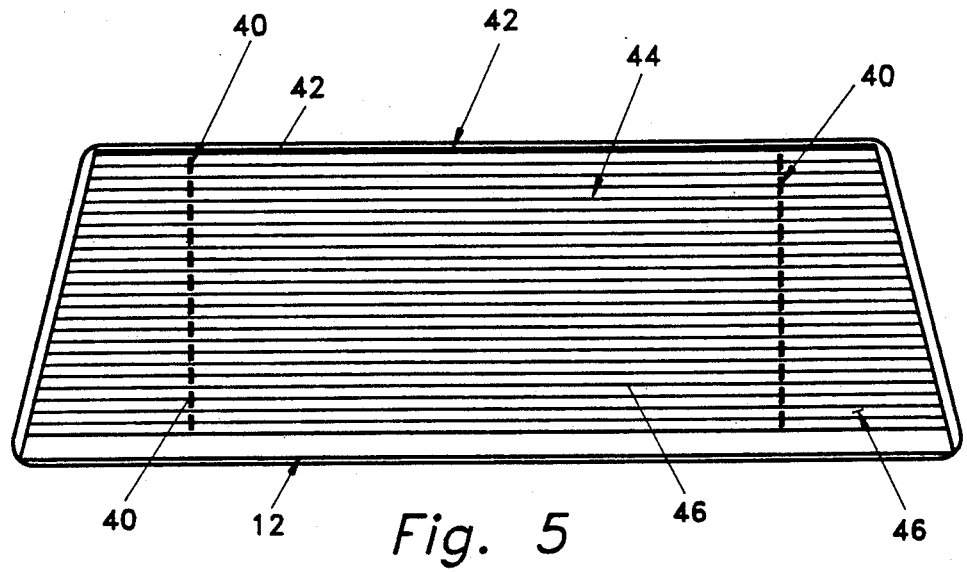
FIG. 5 is a front elevational view of the collapsible sun shade wherein the housing is mounted at the lower part or edge of a rear window of a vehicle and the shade assembly is extended out of the housing to cover the rear window and the plate member or cover plate is connected to a top part or edge of the rear window.
Figure 6:
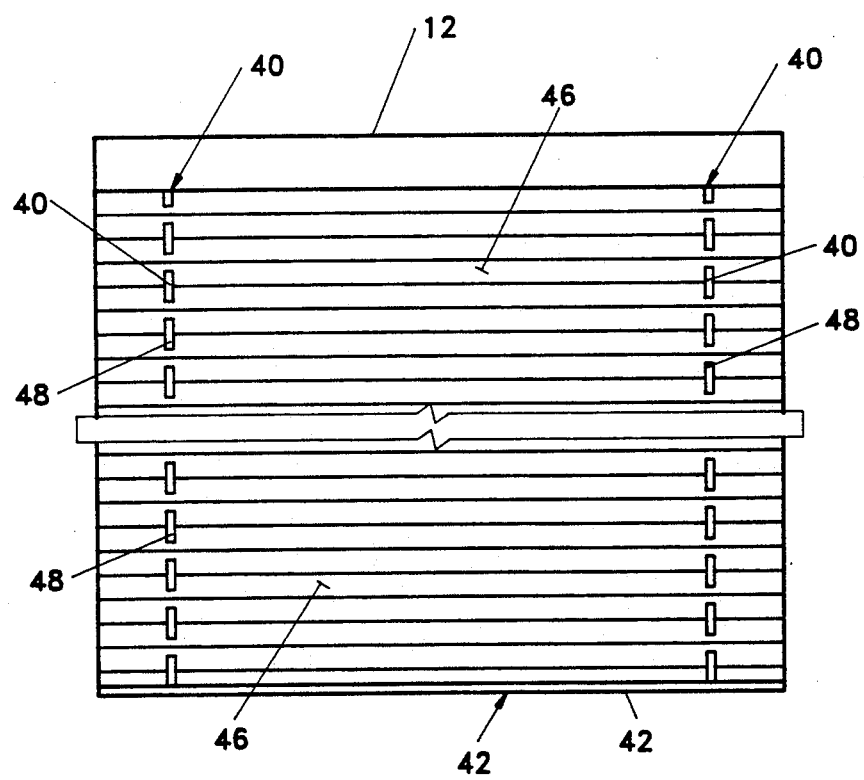
FIG. 6 is a segmented front elevational view of the shade assembly extended out of the housing with the coiled spring plate passing through slots or apertures in each of the panels or blades of the shade assembly.
Figure 7:
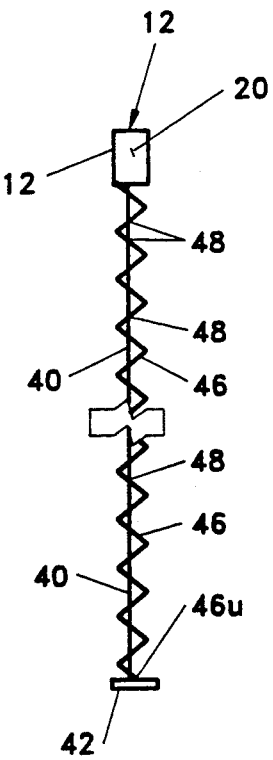
FIG. 7 is a segmented side elevational view of the shade assembly of FIG. 6.

(see FIGS. 6 and 7) therein wherethrough the structure of the spring plate 40 (including lower end portion 40L) passes. More particularly, the spring plate 40 passes through the guide aperture 13 of partition member 11 and/or guide chute 15, and through all slots 48 of the blades 46 of the shielding means 44 as limited between the upper end portion 40U secured to the spindle member 28 and the lower end portion 40L secured to the cover member 42. The blades 46 of the serrated shielding means 44 are preferably of an opaque material capable of blocking light rays. The blades 46 may also have a reflective material or coating to reflect the light rays from the sun. Optionally, they are of a translucent material capable of filtering or modifying a glaring light ray reflected thereagainst, such as from an ornamentation or the hood of a vehicle. A suitable material which the blades 46 may be fabricated from is a cellular, honey-combed material sold under the trademark DUET-TE ® registered to Hunter Douglas Inc., wherein the spring plate 40 is not seen as it passes through each blade 46.

The serrated shielding means 44, more specifically each blade 46 of the shielding means 44, is capable of being folded through the front 18 and into the space between the partition member and lower edges 14e—14e of the sides 14—14 and the cover member 42 biasingly flushed against the lower edges 14e—14e (see FIG. 20) by the retracted coil spring plate such that the serrated shielding means 44 becomes totally enclosed within the housing 12. Because the coiled spring plate 40 is normally resiliently wound on the spindle member 28, once the cover member 42 is pulled away from the spindle member 28 rotatably mounted to support members 22—22 in the hollow housing 12, the resilience force of the spring plate 40 tends to force this cover member 42 back towards the hollow housing 12. More specifically, the resilient force of the spring plate 40 biases or urges the cover member 42 towards the partition member 11 and the rotatable spindle member 28, such as to tend to cause the spring plate 40 to retract itself in a winding fashion around the spindle member 28 and to further tend to cause the pleated blades 46 to fold and collapse against the partition member 11 in the hollow housing 12 (see FIG. 20). To prevent or counteract such resilience force, a brake member, generally illustrated as 60, is provided to releasably engage the spindle member 28 to prevent the same from rotating.

In the preferred embodiment of the invention in FIG. 21, the shaft 26, as previously mentioned, is rotatably secured to each pair of support members 22 and bridges the space 24 therebetween; and the spindle member 28 is rotatably mounted to shaft 26. The brake member 60 for this embodiment is disposed between a support member 22 and the spindle member 28 and comprises a brake coil 62 which surrounds the shaft 26 and is in electrical communication with a power source (e.g. a car battery via the cigarette lighter socket or an electrical outlet in a house). Releasably contacting the brake coil 62 is a brake armature 66 which also surrounds the shaft 26 and is biased by spring 74. When electrical power is applied to the brake coil 62, the brake armature 66 is retracted from contact with spindle member 28 which frees up the spindle member 28 such that it can rotate. Thus, removing the electrical power to coil 62 allows the spring force from spring 74 of the brake member 60 to reposition the brake armature 66 against the spindle member 28 to lock the coiled spring plate 40 in any desired extended positions.

In the embodiment of the brake member 60 in FIG. 22, the brake member 60 comprises a hollow shank 70 slidably engaged to shaft 26. The hollow shank 70 is integrally bound to a flanged base 72 that is biased against the spindle member 28 by a compression spring 74. As best shown in FIG. 22, the spring 74 is in contact with a support member 22 and the flanged base 72 to continually bias the flanged base 72 against the spindle member 28 to prevent the latter from turning. A cord member 76 engages the hollow shank 70 and passes through an end 20 of the hollow housing 12 such that when the cord member 76 is pulled, the compression spring 74 is compressed further and the flanged base 72 is released off of the spindle member 28 such that it can rotate and release spring plate 40. After a predetermined amount of length of the spring plate 40 and the consecutively joined pleated blades 46 have been extended away from the housing 12, the cord member 76 is released such that the flanged base 72 is forced against the spindle member 28 to prevent same from rotating and to lock the predetermined length of the plural blades 46 out of the housing 12.

Figure 11:
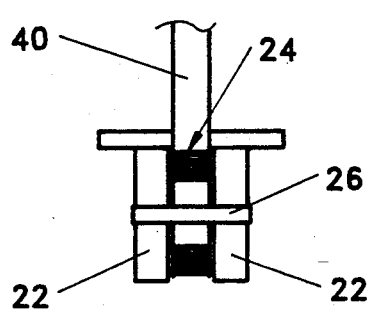
FIG. 11 is an end elevational view of another embodiment of the coiled spring assembly having a pair of coil spring plates wound around a pair of spools or spindle members that are rotatably mounted to a pair of support members such that the coil spring plates mount contiguously with respect to each other in order that the structures of the respective coil spring plates can both pass through a guide slot in a laminar or superimposed contacting form.
Figure 12:
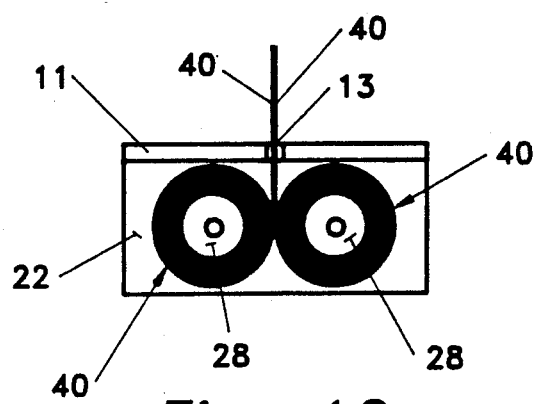
FIG. 12 is a side elevational view of the embodiment of the coiled spring assembly of FIG. 11.
Figure 13:
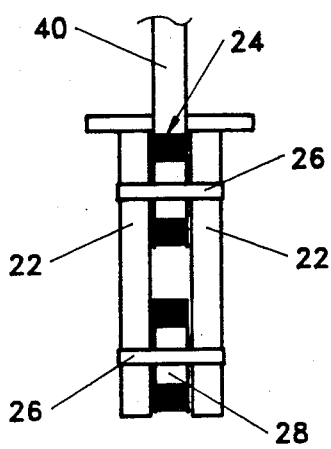
FIG. 13 is another embodiment of the coiled spring assembly having a pair of coil spring plates wound around a pair of spools or spindle members which are rotatably mounted to a pair of support member such that the coil spring plates are vertically aligned in order that the structures of the respective coil spring plates can both pass through a guide slot in a laminar or superimposed contacting form.
Figure 14:
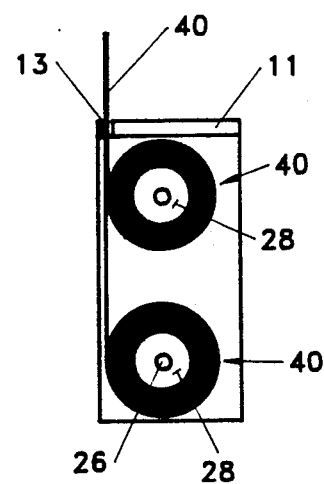
FIG. 14 is a side elevational view of the embodiment of the coiled spring assembly of FIG. 13.
Figure 15:
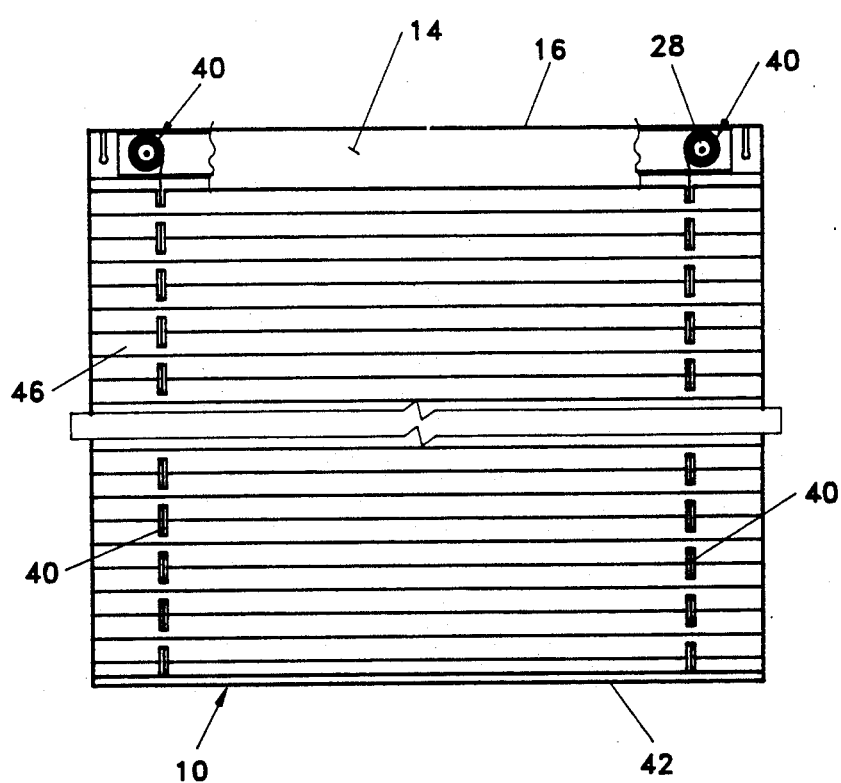
FIG. 15 is a segmented front elevational view of the shade assembly extended out of the housing wherein a pair of coiled spring plates are rotatably mounted such that the axis of the respective spool or spindle member is traverse or laterally disposed with respect to a rectangular shaped hollow housing that encloses the respective spool or spindle members.

As best illustrated in FIGS. 11-14, the coiled spring plate embodiment of the present invention comprises a pair of coiled spring plates 40—40 such that the structural portion of the coiled spring plates that passes through the slots 48 of the respective blades 46 is laminated with two plates 40—40 imposed against each other. In this embodiment, laminated plates 40—40 pass through a guide aperture 13 and/or guide chute 15 and have their respective lower end portions 40L—40L connecting to the cover member 42. The two coiled spring plates 40—40 may be aligned such that the axis of the spindle member 28—28 (and the shafts 26—26), which rotatably supports the coiled spring plates 40—40, is either aligned in and/or with a horizontal plane as depicted in FIGS. 11 and 12, or aligned in and/or with a vertical plane as best shown in FIGS. 13 and 14.

Figure 23:
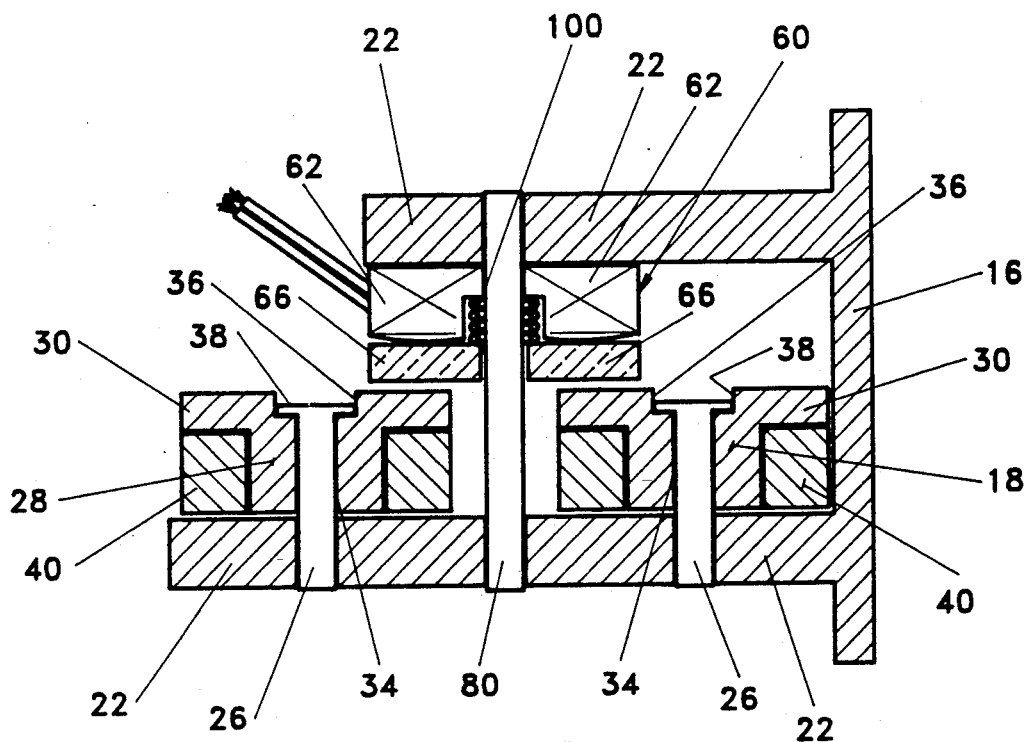
FIG. 23 is a vertical sectional view of an electromechanical brake member disposed on a support member such as to be in a position to releasably engage a pair of spool or spindle members to prevent same from rotating and assisting in the release of a pair of coiled spring plates wound thereto.

Both embodiments of the brake member 60 may be arranged to brake a pair of spindle members 28—28 which rotatably support a pair of coiled spring plates 40—40. In FIG. 23 a shaft 80 extends and bridges the pair of support members 22—22 between a pair of spindle members 28—28 which support a pair of coiled spring plates 40—40 and are rotatably supported on shafts 26—26 that only rotatably engage to one support member 22. The shafts 26—26 for this embodiment are formed with bearing plates 38—38 which seat in recesses 36—36 of the flanged faces 30—30. The brake member 60 for this embodiment has the brake coil 62 which surrounds the shaft 80 and is in electrical communication with a power source. The brake armature 66 is in releasable engagement with the brake coil 62. As shown in FIG. 23, the brake armature 66 also surrounds the shaft 80 and is biased by spring 74. When the brake coil 62 becomes electrically activated, the brake armature 66 is retracted from contact with both spindle members 28—28 such that they both may rotate. After a predetermined length of the spring plates 40—40 and the plural pleated blades 46 have been extended away from the housing 12, electrical power is removed from the coil 62 to allow the spring force from spring 74 of the brake member 60 to reposition the brake armature 66 against both spindle members 28—28 to lock the pair of coiled spring plates 40—40 from rotating the spindle members 28—28.

Figure 24:
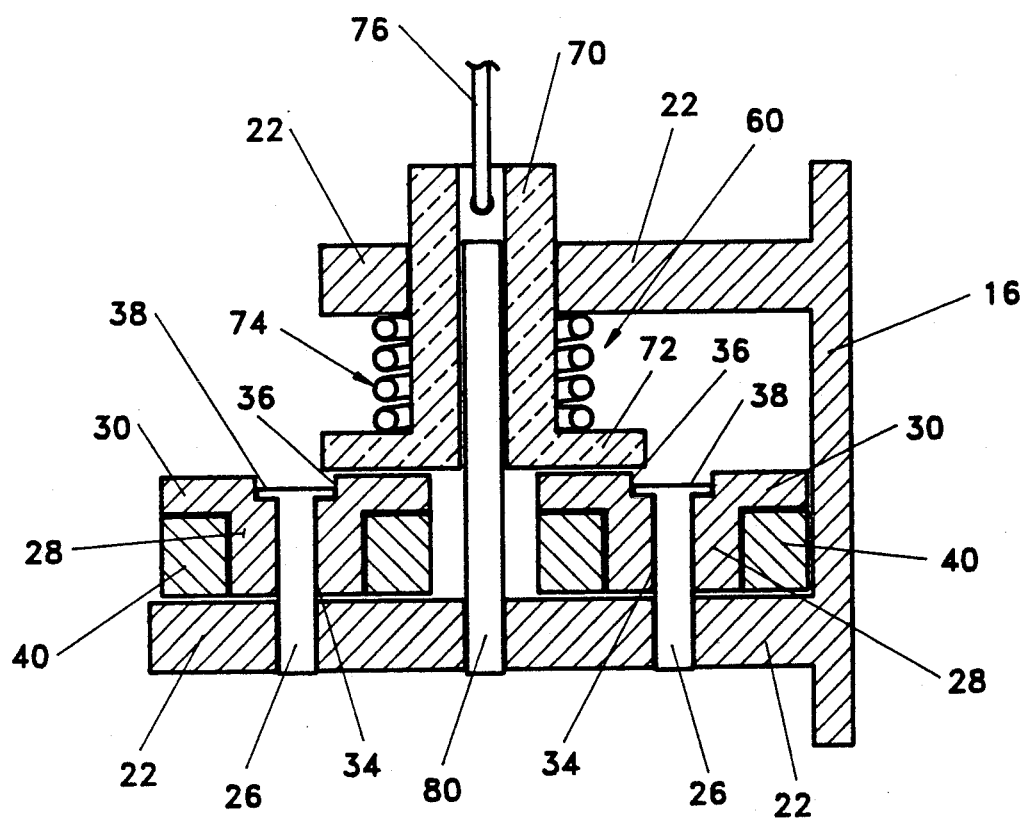
FIG. 24 is a vertical sectional view of a mechanical brake member disposed on a support member such as to be in a position to releasably engage a pair of spool or spindle members to prevent same from rotating and assisting in the release of a pair of coiled spring plates wound thereto.

For the embodiment of the brake 60 in FIG. 24, the hollow shank 70 is slidably engaged to shaft 80 which bridges the pair of support members 22—22 between a pair of spindle members 28—28 which are rotatably supported by shafts 26—26. The shafts 26—26 for this embodiment are identical to shafts 26—26 in FIG. 23 since they too are formed with bearing plates 38—38 that seat in recesses 36—36 of the flanged faces 30—30 of the spindle members 28—28. When the cord member 76 is pulled, the compression spring 74 is compressed further and the flanged base 72 is released from engagement with both spindle members 28—28 such that they are free to rotate and release both spring plates 40—40 in a laminated form. After a predetermined length of laminated spring plates 40—40 has been extended away from the housing 12, the cord member 76 is released such that the flanged base 72 is formed against both flanged faces 30—30 of the spindle members 28—28 to prevent them from rotating and to lock the predetermined length of laminated spring plates 40—40 (along with a predetermined length of plural blades 46) out of the housing 12.

Figure 10:
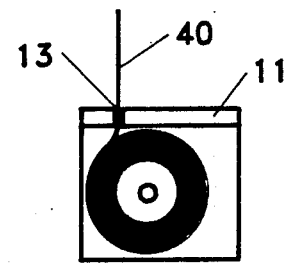
FIG. 10 is a side elevational view of the embodiment of the coiled spring plate of FIG. 9.
Figures 25, 26:
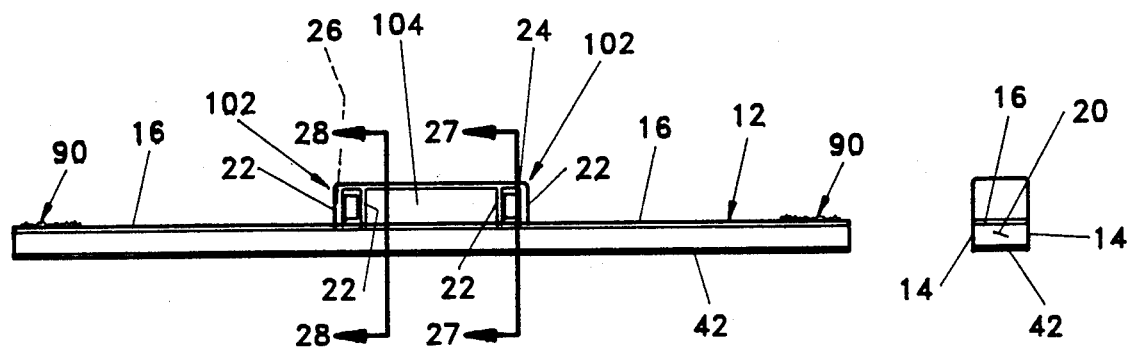
FIG. 25 is a side elevational view of another embodiment of the invention wherein a pair of coiled spring plates are mounted in a handle.
FIG. 26 is an end elevational view of the embodiment of the invention in FIG. 25.
Figures 27, 28:
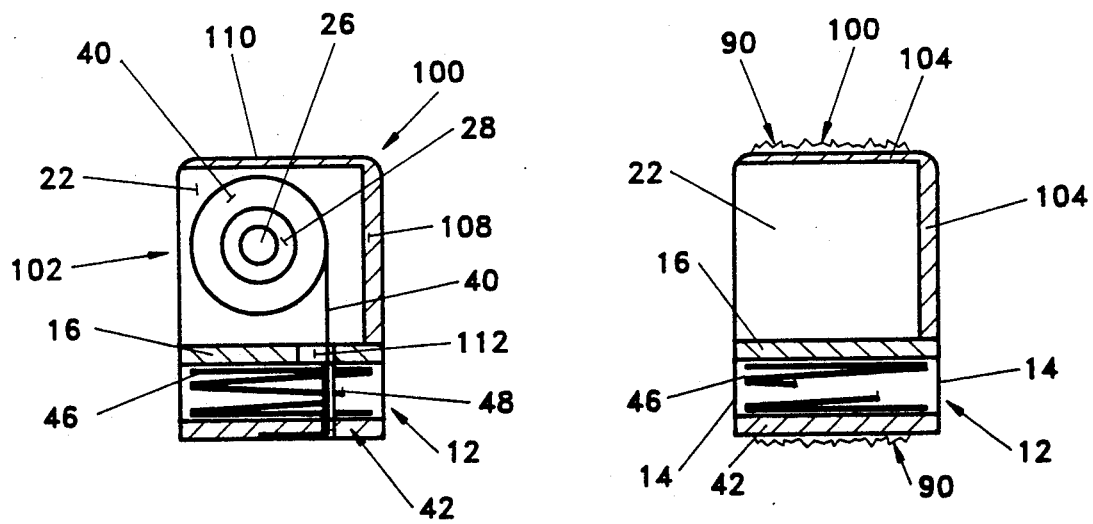
FIG. 27 is a vertical sectional view taken in direction of the arrows and along the plane of line 27—27 in FIG. 25.
FIG. 28 is a vertical sectional view taken in direction of the arrows and along the plane of line 28—28 in FIG. 25.

In the embodiment of the invention in FIGS. 25-30, a handle, generally illustrated as 100, is secured to the back 16 of the housing 12. The handle 100 comprises a pair of hollow ends, each generally illustrated as 102, with an L-shaped bridging member 104 interconnecting the two hollow ends 102—102. The hollow ends 102 are each preferably formed with a pair of support members 22—22 and a rear wall 108 secured to the pair of support members 22—22 and a roof 110 secured to the support members 22—22 and to the rear wall 108 (see FIG. 27). The space 24 is between the support members 22—22. Between the pair of support members 22—22 of the handle 100 and bridging the space 24 is the shaft 26. Rotatably mounted on the shaft 26 is the spool 28. Between the support members 22—22 of each hollow end 102 is the embodiment of the invention in FIG. 22 (i.e., brake member 60-spring plate 40 combination), or the embodiment in FIGS. 9-10 having a sole spring plate 40, or the embodiment of FIGS. 11-14 which may also be braked as indicated in FIGS. 23 and 24. By way of example only, FIGS. 25-30 depict a single spring plate 40 (i.e., the embodiment in FIGS. 9-10) with the back 16 having an aperture 112 wherethrough the spring plate 40 passes (see FIG. 27). As best shown in FIGS. 25 and 28, the bridging member 104, the cover plate 42, and the back 16 of the hollow housing 12, each may include a fastening means, identified as "90" below.

Figure 29:
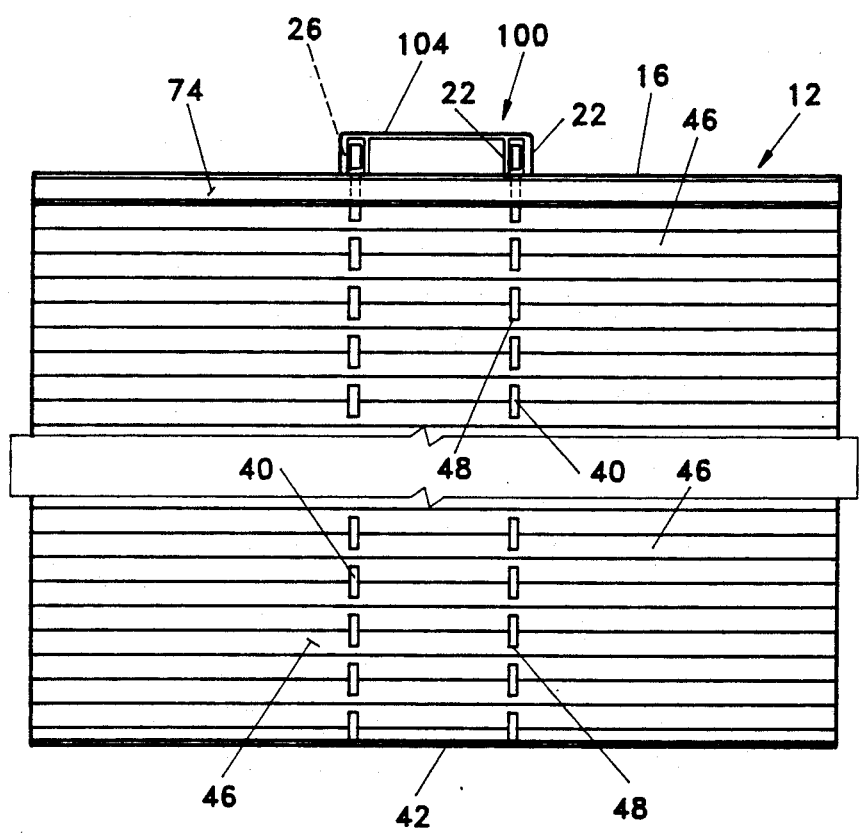
FIG. 29 is a side elevational view of the embodiment of the invention in an expanded position.
Figure 30:
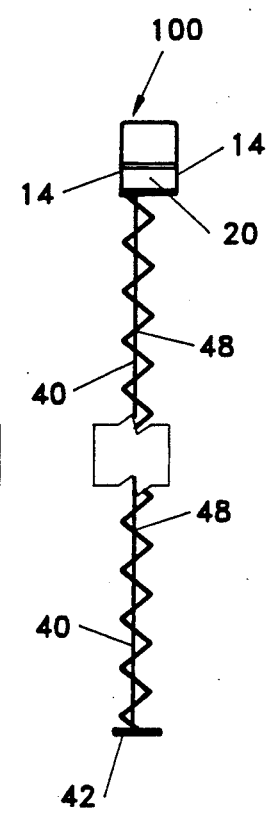
FIG. 30 is an end elevational view of the embodiment of the invention in FIG. 29.
Figure 31:
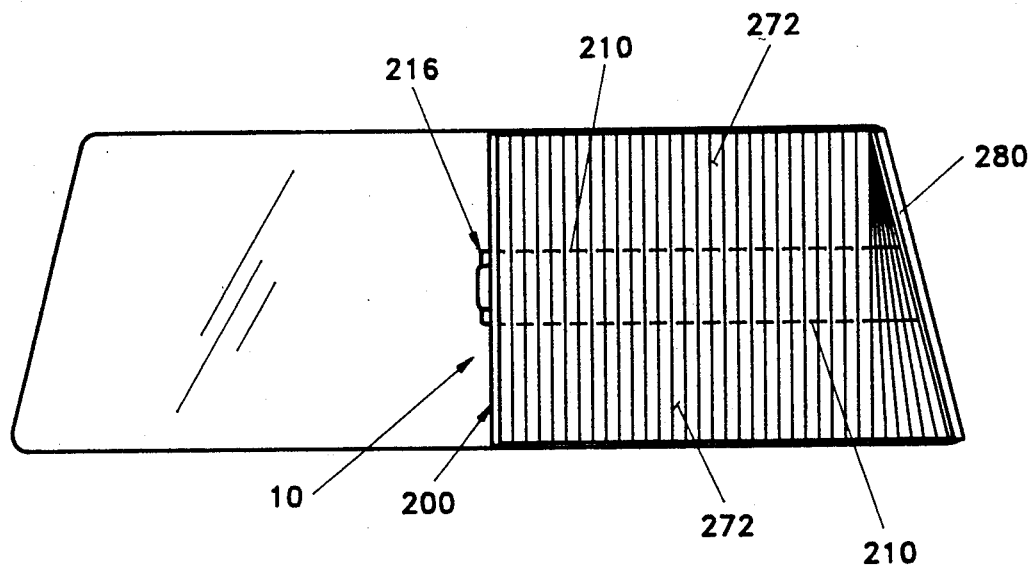
FIG. 31 is a front elevational view of another embodiment of the retractable and self-storing sun shade in a partially extended position across an automobile windshield.
Figure 32:
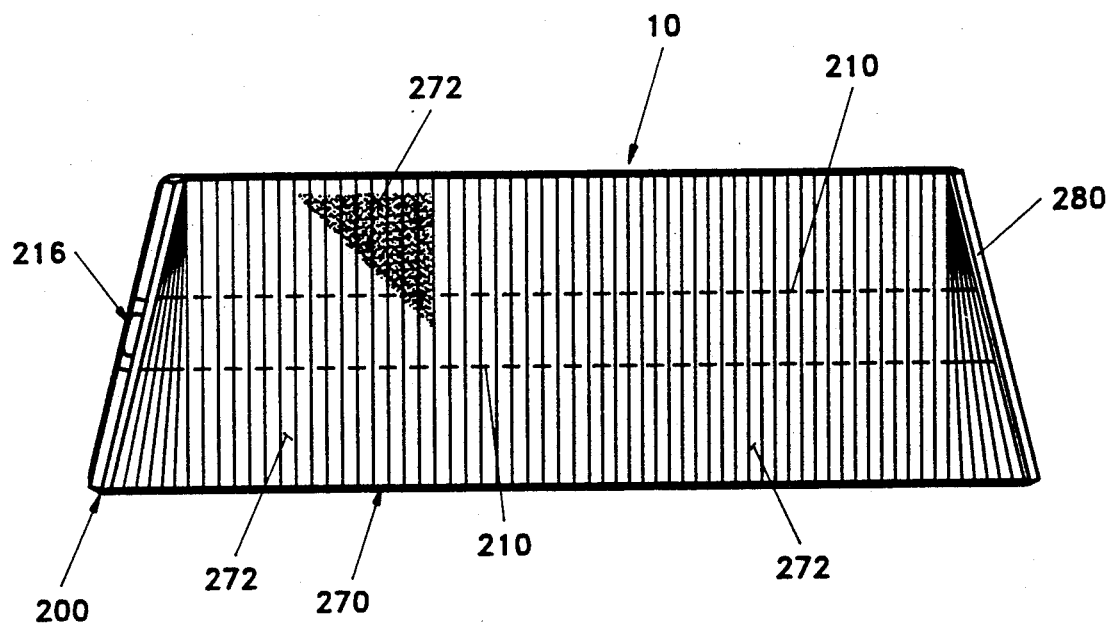
FIG. 32 is a front elevational view of the retractable and self-storing sun shade of FIG. 31 extended out of the housing and entirely across the windshield of the automobile with the plate member or cover plate connected to the windshield or to a support post opposed to the support post supporting the housing of the retractable and self-storing sun shade.

The housing 12 of the present invention may be secured to any window or windshield or to any support post such as by the employment of any suitable fastening means, generally illustrated as 90, on the housing 12 such as a hook 92 for engaging an eyelet (not shown) on the support post, or a hook-loop fastening assembly 94 sold under the trademark VELCRO ®. Similarly, after the cover member 42 has been pulled away from the housing 12 to extend a desired length of pleated blades 46 out of the housing for sun shielding purposes, the cover member 42 may be connected to any window or windshield or to any support post such as by the use of the hook 92 or the hook-loop fastening assembly 94, both of which connect to the cover member 42. The suitable fastening means 90 for both the housing 12 and cover member 42 include high-energy permanent magnets, two-sided tape, adhesive, high-temperature/high-strength super lock fasteners, Snap Fasteners etc. In the embodiment of the invention in FIGS. 25-30, the cover plate 42 is connected to a door post, a windshield, a rear deck of an automobile, etc. through the use of or by the fastening means 90. The handle 100 is subsequently grasped and pulled, causing the housing 12 to also move simultaneously which in turn further causes the coiled spring plates 40—40 to uncoil and blades to become extended out from the housing 12 as shown in FIG. 29. The fastening means 90 on the bridging member 110 (of the handle 100) or the fastening means 90 on the back 16 (of the housing 12) may be secured to the door post, etc., on the opposite side of the windshield or window.

Referring in detail now to FIGS. 31-37 for another preferred embodiment of the invention, there is seen the collapsible sun shade 10 comprising a generally hollow housing, generally illustrated as 200, which has a pair of opposed sides 202—202 with lower edges 202e—202e, a top (or back) 204 bound to the opposed sides 202—202, and a front, generally illustrated as 206, which is generally open. The top (or back) 204 has a guide aperture 208 wherethrough the structure of a cord (or line), to be identified below as 210, passes. Connected to the ends of the sides 202—202 and the top (or back) 204 is a pair of ends 212—212. The function of the guide aperture 208 is to guide the below identified cord as it passes into the hollow housing 200.

Mounted on the top (or back) 204 of the housing 200 is a generally hollow handle (or a hollow housing in general), generally illustrated as 216. The handle (or hollow housing) 216 includes a bottom 218, a side 220 attached to and circumscribing the bottom 218, and a roof (or top) 222 connected to and supported by the side 220. A lug or lip member 224 may be conveniently mounted to the roof 222 to provide a structure where a user's hand can contact and grasp the same. The previously indicated fastening means is secured to the lug or lip member 224 and/or on the handle member 216 to secure same to a support post (see FIG. 38). The bottom 218 preferably has three (3) generally planar surfaces 226-228-230. As best illustrated in FIG. 34, planar surface 226 and 230 are disposed lower than planar surface 228 with respect to the vertical view of the bottom 218 in FIG. 34. Stated alternatively, planar surface 228 is distant from planar surfaces 226 and 230 and is at a higher elevation as shown in FIG. 34. The bottom 218 has an openings 232—232 wherethrough a cord (to be identified below as 210) passes for further passing through guide aperture 208 of the housing 200.

A pair of output spools (or output spindle members), each generally illustrated as 234—234, is respectively rotatably mounted to and around an output shaft 236. As shown in FIG. 34, an output shaft 236 is secured to the bottom 218 through the planar surfaces 226 and 230; thus, there are preferably two output shafts 236—236. The bottom 218 also has a pair of spring shafts 240—240 which pass through the planar surface 228. Rotatably mounted to each spring shaft 240 is a generally cylindrical spring storage spool (or spring spindle member) 242—242. Each output spool 234 is generally cylindrical geometrically and includes a spring surface 243, a cord surface 244, and a lip or partition member 246 separating the spring surface 243 from the cord surface 244. The spring surface 243 has a smaller diameter than the cord surface 244. Output spools 234—234 rotate against surface 226 and 230. The storage spools 242—242 rotate against planar surface 228. As best shown in FIG. 33, the lip or partition member 246 circumscribes or encircles the output spool 234 which is separating the spring surface 243 and the cord surface 244.

A constant force spring plate, generally illustrated as 250, is provided and has a pair of opposed ends 252-254. End 252 is engaged to the spring spool 242 and end 254 is engaged to the spring surface 243 of the output spool 234. As best shown in FIGS. 33 and 34 there are a pair of constant force spring plates 250—250, with each constant force spring plate 250 interconnecting an output spool 234 and a spring spool 242 as immediately indicated. The constant force spring plate 250 is normally resiliently wound on the spring spool 242. As was seen for coiled spring plate 40, the constant force spring plate 250 may be any structure possessing a constant force such that there is a bias or tendency to recoil on the spring spool 242 without the use of any outside force, such as a restoring spring (not shown) in the spring spool (or spindle) 242 to help restore the spring plate 250 around the cylindrical body of the spring spool 242. Each constant force spring 250 is produced to provide a specific force which is exerted through the entire extension of the spring. The force is constant as long as the radius remains constant. In longer springs, this change in radius, due to diameter build-up, causes the spring to increase in load slightly as it is extended. In some applications, it is desirable for the spring 250 to have less force as it is extended, while in others it is preferable to have more force. A spring 250 that produces less force while being extended is said to have a negative gradient. Negative gradients of as much as 25% are possible. A spring 250 that produces more force as it is extended is said to have a positive gradient. Positive gradients of up to 500% are possible. Constant force springs 250 deliver more force per pound of material than gravity devices. Several materials are used to make constant force springs 250. These include stainless steel, high carbon steel, beryllium copper, plastic and others as they are required. Type 301 Stainless Steel has proven to be superior for consistent quality, life, availability, stress retention and lowest product cost. A suitable constant force spring plate 250 is that sold by the Vulcan Spring and Mfg. Co. and as described in "VULCAN Constant Force Spring Design Guide" and fully incorporated herein by reference thereto. In a preferred embodiment of the invention, the constant force spring 250 is a constant torque spring. A constant torque spring is made of a specially stressed constant force spring traveling between two spools. The spring is stored on a storage spool (i.e. the spring spool 242) and wound reverse to its natural curvature on an output spool (i.e. the spring surface 243 of the output spool 234). When released, torque is obtained from the output spool as the spring returns to its natural curvature on the storage spool. No useful torque may be obtained from the storage spool. The torque produced by a constant torque spring can be constant over the entire retraction of the spring. The springs may also be designed to produce a negative or a positive gradient. In a preferred embodiment of the invention, the constant torque spring is that sold by Vulcan Spring and Mfg. Co. and described in the above mentioned "VULCAN Constant Force Spring Design Guide".

A cord (or line or wire or the like) 210 has an end 260 connected to the cord surface 244. The cord 210 also has an end 262 that passes through opening 232 and guide aperture 208 of the housing 200. The end 262 also passes through a slot (to be identified below) in each of a plurality of blades (also to be identified below) and connects to a plate member (or cover plate/member) that will be identified as 280 below.

Furthermore with respect to the embodiment of the invention in FIGS. 31-37, a serrated shielding means, generally illustrated as 270, is provided for shielding the sun, and includes plural pleated blades 272 (or panel members) consecutively adjoined together to form a serrated (or corrugated) shape as viewed from its longitudinal section. The serrated shielding means 270 has an upper blade 272U secured to the top (or back) 204 of the housing 200 and a lower blade 272L secured to a plate or cover member 280. As best shown in FIG. 38, the previously identified suitable fastening means 90 may be connected to the cover member 280 to secure same to a support post. Each blade 272 (including blades 272U and 272L) is formed with a slot 278 (see FIGS. 37 and 38) therein wherethrough the structure of the cord 210 passes. More particularly, the cord 210 passes through the opening 232 and the guide aperture 208 of the housing 200, and through all slots 278 of the blades 272 of the shielding means 270. As was seen for blades 46 the blades 272 of the serrated shielding means 270 are preferably of an opaque material capable of blocking light rays. The blades 272 may also have a reflective material or coating to reflect the light rays from the sun. Optionally, they are of a translucent material capable of filtering or modifying a glaring light ray reflected thereagainst, such as from ornamentation or the hood of a vehicle. As was further seen for blades 46, a suitable material which the blades 272 may be fabricated from is a cellular, honeycombed material sold under the trademark DUETTE ® registered to Hunter Douglas, Inc., wherein the cord 210 is not seen as it passes through each blade 272.

The serrated shielding means 270, more specifically each blade 272 of the shielding means 270, is capable of being folded through the front 206 and into the space between the top (or back) 204 and lower edges 202e—202e of the sides 202—202. The cover member 280 may biasingly flush against the lower edges 202e—202e by the retracted constant torque spring plate 250 such that the serrated shielding means 270 becomes totally enclosed within the housing 200. Because the constant torque spring plate 250 is normally resiliently wound on the spring spool 242, once the cover member 280 is pulled away from the housing 200 (causing the cord 210 secured to the cover member 280 to start rotating the output spool 234 by unwinding therefrom which in turn further causes the rotating output spool 234 to commence winding the constant torque spring plate 250 off of the spring spool 242 and onto the spring surface 243), the resilience force of the spring plate 250 tends to force the cover member 280 back towards the hollow housing 200 by the constant torque spring plate 250 tending biasingly to wind and return to its natural curvature on the spring spool 242 which in turn causes the output spool 234 to wind up the cord 210 (and pull the cover member 280). The constant torque spring plate 250 winding and returning to its natural curvature on the spring spool 242 forces the output spool 234 to rotate in a direction which causes the cord 210 to wind around the cord surface 244 and pull the cover member 280 towards the hollow housing 200. As the cord 210 is being wound around the cord surface 244 of the output spool 234, the constant torque spring plate 250 is unwinding off and from the spring surface 243 and onto the spring spool 242. As the cord 210 is retracting in a winding fashion around and on the cord surface 244 of the output spool 234, this causes the pleated blades 272 to fold and collapse against each other and within the hollow housing 200. To prevent and counteract such resilience force of the constant torque spring plate 250 (and after the cover member 280 has been pulled away from the housing 200 to extend a desired length of pleated blades 272 out of the housing 200 for sun shielding purposes), the previously identified any suitable fastening means 90 may connect and hold the cover member 280 to any window or windshield or to any support post. It is to be understood and readily apparent that the handle member 216 (and the lip member 224) has previously also been secured to a support post or the like by the fastening means 90. The release of either the handle member 216 (and the lip member 224) or the cover member 280 from any support post would cause the spring plate 250 to retract the pleated blades 272 into the housing 200. It is to be further understood and readily apparent that the cover member 280 may be initially secured to a support post, and the handle member 216 (and/or the lip member 224) is grasped by the user and pulled away from the secured cover member 280 in order to extend a desired length of pleated blades 272 out of the housing 200.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A collapsible sun shade comprising:
a generally hollow housing; a handle member secured to said generally hollow housing; at least the output spool rotatably secured within the handle member and having a structure defining a spring surface and a cord surface; at least one spring spool rotatably disposed in said handle member; at least one constant force spring plate engaged to said spring spool and to said spring surface of said output spool; a shielding means for shielding the sun and including a plurality of blades cooperating together to provide a shielding of the sun with a lower extreme blade defining a lower blade and an upper extreme blade coupled to said hollow housing and with each of said plurality of blades having a structure defining an aperture; at least one cord member connected to the cord surface of the output spool and passing from the handle member and into the generally hollow housing and passing through the aperture of each blade; and said shielding means is a serrated shielding means for shielding the sun and wherein said plurality of blades are pleated blades consecutively adjoined together to provide a serrated shape; and said handle member comprises a bottom with an aperture where through said cord member passes, and said bottom has a structure with a first surface whereagainst the output spool rotates against and a second surface whereagainst the spring spool rotates against, said first surface being at a lower position than the second surface with respect to a side view of the bottom.

2. The collapsible sun shade of claim 1 wherein said spring surface and said cord surface are both generally cylindrical surfaces with the spring surface having a smaller diameter than the cord surface.

3. The collapsible sun shade of claim 2 additionally comprising a plate member connected to the lower extreme blade.

4. The collapsible sun shade of claim 3 wherein said plate member has a fastening means secured thereto for engaging a support member when the shielding means is extended away from the hollow housing.

5. The collapsible sun shade of claim 4 wherein said output spool additionally has a lip member separating said spring surface and said cord surface.

6. The collapsible sun shade of claim 5 where said handle member additionally comprises a handle wall secured to the bottom and a handle top secured to the handle wall.

7. The collapsible sun shade of claim 6 wherein said constant force spring plate is a constant torque spring.

8. The collapsible sun shade of claim 1 additionally comprising a plate member connected to the lower extreme blade.

9. The collapsible sun shade of claim 8 wherein said plate member has a fastening means secured thereto for engaging a support member when the shielding means is extended away from the hollow housing.

10. The collapsible sun shade of claim 2 wherein said output spool additionally has a lip member separating said spring surface and said cord surface.

11. The collapsible sun shade of claim 1 wherein said handle member additionally comprises a handle wall secured to the bottom and a handle top secured to the handle wall.

12. A collapsible sun shade comprising:
a generally hollow housing; a handle member secured to said generally hollow housing; a first output spool rotatably secured within the handle member and having a structure defining a first spring surface and a first cord surface; a second output spool rotatably secured within the handle member and having a structure defining a second spring surface and a second cord surface; a first spring spool rotatably disposed in said handle member; a second spring spool rotatably disposed in said handle member; a first constant force spring plate engaged to said first spring spool and to said first spring surface of said first output spool; a second constant force spring plate engaged to said second spring spool and to said second spring surface of said second output spool; a shielding means for shielding the sun and including a plurality of blades cooperating together to provide a shielding of the sun with a lower extreme blade defining a lower blade and an upper extreme blade coupled to said hollow housing and with each of said plurality of blades having a structure defining a first aperture and a second aperture; a first cord member connected to the first cord surface of the first output spool and passing from the handle member and into the generally hollow housing and passing through the first aperture of each blade; and a second cord member connected to the second cord surface of the second output spool and passing from the handle member and into the generally hollow housing and passing through the second aperture of each blade; and said shielding means is a serrated shielding means for shielding the sun and wherein said plurality of blades are pleated blades consecutively adjoined together to provide a serrated shape; and said handle member comprises a bottom with a first bottom aperture where through said first cord member passes and a second bottom aperture wherethrough said second cord member passes, and said bottom has a structure with a first surface whereagainst the first output spool rotates against and a second surface whereagainst the second output spool rotates against and a third surface whereagainst the first spring spool and the second spring spool rotates, said first and second surfaces being at a lower position than the third surface with respect to a side view of the bottom.

13. The collapsible sun shade of claim 12 wherein said first spring surface and said first cord surface are both generally cylindrical surfaces with the first spring surface having a smaller diameter than the first cord surface.

14. The collapsible sun shade of claim 12 wherein said second spring surface and said second cord surface are both generally cylindrical surfaces with the second spring surface having a smaller diameter than the second cord surface.

15. The collapsible sun shade of claim 13 wherein said second spring surface and said second cord surface are both generally cylindrical surfaces with the second spring surface having a smaller diameter than the second cord surface.

16. The collapsible sun shade of claim 12 additionally comprising a plate member connected to the lower extreme blade.

17. The collapsible sun shade of claim 16 wherein said plate member has a fastening means secured thereto for engaging a support member when the shielding means is extended away from the hollow housing.

18. The collapsible sun shade of claim 15 wherein additionally comprising a plate member connected to the lower extreme blade.

19. The collapsible sun shade of claim 18 wherein said plate member has a fastening means secured thereto for engaging a support member when the shielding means is extended away from the hollow housing.

20. The collapsible sun shade of claim 12 wherein said first output spool additionally has a first lip member separating said first spring surface and said first cord surface.

21. The collapsible sun shade of claim 19 wherein said first output spool additionally has a first lip member separating said first spring surface and said first cord surface.

22. The collapsible sun shade of claim 21 wherein said handle member additionally comprises a handle wall secured to the bottom and a handle top secured to the handle wall.

23. The collapsible sun shade of claim 12 wherein said handle member additionally comprises a handle wall secured to the bottom and a handle top secured to the handle wall.

* * * * *